Sept. 26, 1944.  J. D. WARNER  2,359,177

ROTATING JIG

Filed Aug. 13, 1943

INVENTOR:
JAMES D. WARNER,
BY John E Jackson
ATTORNEY.

Patented Sept. 26, 1944

2,359,177

UNITED STATES PATENT OFFICE 2,359,177

ROTATING JIG

James D. Warner, Ely, Minn., assignor to Oliver Iron Mining Company, a corporation of Minnesota Application August 13, 1943, Serial No. 498,532

4 Claims. (Cl. 253—2)

This invention relates to a rotating jig and more particularly to a jig to be used in sandblasting diamond impregnated core drill bits or other objects requiring similar treatment.

The bit is rotated and forced against a rock or ore formation, thus causing the drill to become dull. A popular type of core drill bit is one which has its cutting edge made of an alloy called the matrix, impregnated with black diamonds. The diamonds become polished resulting in a smooth non-cutting edge and the bit must be reconditioned by sandblasting. The sandblasting is performed inside of a dust tight cabinet where there is a blasting nozzle which expels, by compressed air, an abrasive material, such as powdered silicon-carbide. The operator working through the side of the cabinet places the bit on a holder which he rotates by hand under the blast. A glass window in the cabinet enables him to see the operation within the cabinet. The matrix is removed by the blast so that new diamonds are exposed and a new cutting edge formed. This method requires from two to five minutes of sandblasting and the process becomes very fatiguing, resulting in a very uneven cutting surface on the bit.

It is an object of this invention to provide a jig which may be rotated by means of fluid pressure.

Another object is to provide a jig in which the fluid which rotates the jig prevents damage to the bearings of the jig.

These and other objects will be more apparent after referring to the following specification and attached drawing, in which.

Figure 1:
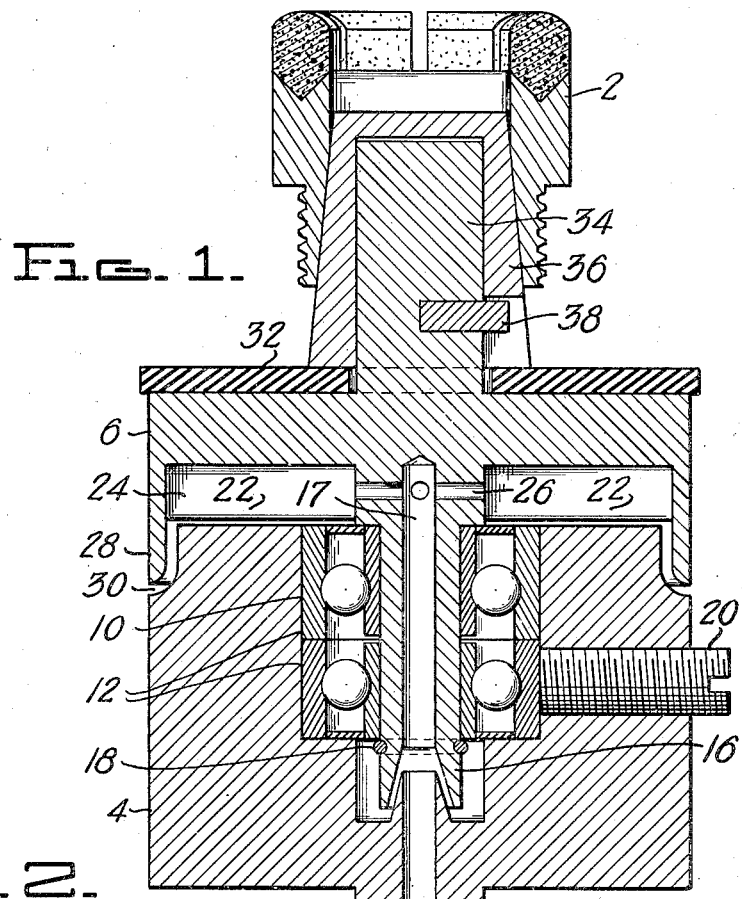
Figure 1 is a cross-sectional view of the jig.
Figure 2:
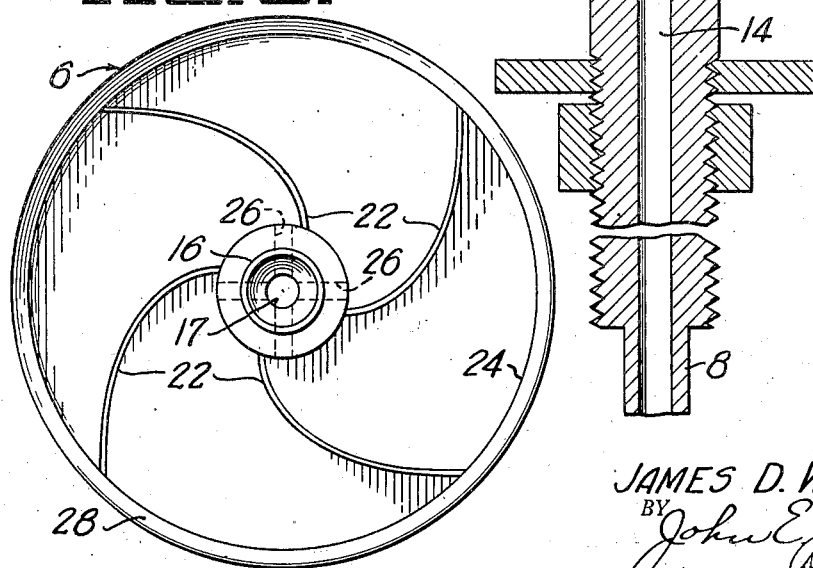
Figure 2 is a bottom view of the rotor.

Referring more particularly to the drawing, the reference numeral 2 indicates a core drill bit having a matrix impregnated with black diamonds. The rotating jig consists of a bearing holder 4 and a rotor 6 mounted thereon. The bearing holder 4 has a stem 8 by which it is supported in any suitable manner. The bearing holder 4 has an opening 10 in the upper part thereof for receiving bearings 12. Communicating with this chamber 10 is an axial opening 14. The rotor 6 has a shaft 16 through which extends an axial opening 17. The bearings 12 are pressed on the shaft 16 and held in place by means of a snap ring 18. Set screw 20 holds the assembly in place in the bearing holder 4.

The rotor 6 has at least two vanes 22 arranged in a chamber 24. Between the chamber 24 and the axial opening 17 are at least two orifices 26. The top of the bearing holder 4 is reduced in diameter and a skirt 28 on the rotor 6 extends down over the reduced portion of the bearing holder to form an exhaust port 30. Fastened to the top of the rotor 6 is a replaceable rubber washer 32 which protects the rotor against damage from the abrasive. A spindle 34 on the top of the rotor 6 carries an adapter 36 which is held in place on the spindle 34 by means of stop plug 38. Various sizes of adapters are provided so that various types and sizes of bits or other workpieces may be placed on the jig for sandblasting.

The operation of the device is as follows:

A workpiece 2 is placed on the jig on the spindle 34 within a dust tight compartment. Compressed air is supplied to the jig through an air hose fastened to the stem 8 and extending through the wall of the sandblasting cabinet to a control valve placed within easy reach of the operator. The air passes through openings 14 and 17, and orifices 26 to the vanes 22, causing the rotor 6 to rotate, thus turning the workpiece 2 under the sandblasting nozzle. To keep the jig operating, it is necessary to prevent the abrasive material from entering the bearings. This is accomplished by means of the exhaust air passing out through exhaust port 30. The length of the sandblasting time depends upon the condition of the bit and the time required is quickly learned through experience by the operator. The jig rotates the bit under the blast at a positive set position of distance and angle in respect to the blast and the speed of rotation can be controlled at will, thus resulting in a uniform cutting surface on the bit.

While one embodiment of the invention has been shown and described, it will be apparent to one skilled in the art that other adaptations and modifications may be made without departing from the scope of the following claims.

I claim:

1. A fluid operated rotating jig comprising a bearing holder having an opening therein for passage of said fluid, a bearing mounted in said holder, a rotor having a shaft mounted for rotation in said bearing, said shaft having an axial opening therein communicating with said first named opening, a plurality of vanes mounted on said rotor, means for supplying fluid from said shaft opening to said vanes, a spindle on said rotor for supporting a workpiece, and means for exhausting said fluid from said rotor to prevent foreign matter from entering said bearing.

2. A fluid operated rotating jig comprising a bearing holder having an axial opening therein for passage of said fluid, a bearing mounted in said holder, a rotor having a shaft mounted for rotation in said bearing, said shaft having an axial opening therein communicating with said first named opening, a plurality of vanes on said rotor, a plurality of orifices in said shaft leading from said shaft opening to said vanes, a spindle on said rotor for supporting a workpiece to be sandblasted, and means for exhausting said fluid from said rotor to prevent the abrasive of said sandblast from entering said bearing.

3. A fluid operated rotating jig comprising a bearing holder having an opening therein for passage of said fluid, a bearing mounted in said holder, a rotor having a shaft mounted for rotation in said bearing, said shaft having an axial opening therein communicating with said first named opening, a plurality of vanes mounted on said rotor, means for supplying fluid from said shaft opening to said vanes, a spindle on said rotor for supporting a workpiece, a reduced portion on said bearing holder adjacent said rotor, and a skirt on said rotor extending over said reduced portion to form a passageway therebetween for exhausting said fluid from said rotor to prevent foreign matter from entering said bearing.

4. A fluid operated rotating jig comprising a bearing holder having an axial opening therein for passage of said fluid, a bearing mounted in said holder, a rotor having a shaft mounted for rotation in said bearing, said shaft having an axial opening therein communicating with said first named opening, a plurality of vanes on said rotor, a plurality of orifices in said shaft leading from said shaft opening to said vanes, a spindle on said rotor for supporting a workpiece to be sandblasted, a reduced portion on said bearing holder adjacent said rotor, and a skirt on said rotor extending over said reduced portion to form a passageway therebetween for exhausting said fluid from said rotor to prevent the abrasive of said sandblast from entering said bearing.

JAMES D. WARNER.